United States Patent
Tomita

(10) Patent No.: US 6,175,459 B1
(45) Date of Patent: Jan. 16, 2001

(54) MAGNETIC DISK DRIVE WITH A DISK MEDIUM DEFECT DETECTOR AND READ CHANNEL IC USED IN THE DRIVE

(75) Inventor: Isamu Tomita, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/123,749

(22) Filed: Jul. 27, 1998

(30) Foreign Application Priority Data

Dec. 1, 1997 (JP) .................................................... 9-330354

(51) Int. Cl.[7] ....................................................... G11B 5/09
(52) U.S. Cl. ................................................. 360/53; 360/25
(58) Field of Search ................................. 360/53, 25, 46, 360/51, 31; 369/58

(56) References Cited

U.S. PATENT DOCUMENTS

| | | | |
|---|---|---|---|
| 5,424,638 | * 6/1995 | Huber | 360/25 X |
| 5,754,353 | * 5/1998 | Behrens et al. | 360/53 |
| 5,822,139 | * 10/1998 | Ayabe | 360/25 X |
| 5,905,601 | * 5/1999 | Tsunoda | 360/53 |

FOREIGN PATENT DOCUMENTS 244272    2/1990   (JP) .

* cited by examiner

Primary Examiner—Alan T. Faber
(74) Attorney, Agent, or Firm—Greer, Burns & Crain, LTD

(57) ABSTRACT

A magnetic disk drive capable of specifying even the type of a medium defect with a small number of read/write operations is disclosed. A read signal is sampled. A defect detector 40 of a read channel IC includes a (1+D) calculation circuit 41 for adding the current and preceding sample values or the absolute values thereof. The two types of sums of the current and preceding samples are compared with a lower reference value and an upper reference value preset in comparators 42, 43, respectively. A portion where the sum of the sample values exceeds the upper reference value is detected as a medium defect due to thermal asperity, a portion where the sum of the absolute values of the sample values is lower than the lower reference value is detected as a medium defect due to a missing, signal and a portion where the sum of the absolute values of the sample values exceeds the upper reference value as a medium effect due to an extra, signal thereby generating a defect detection signal DD. Three types of defects can thus be detected with a single read operation.

13 Claims, 11 Drawing Sheets

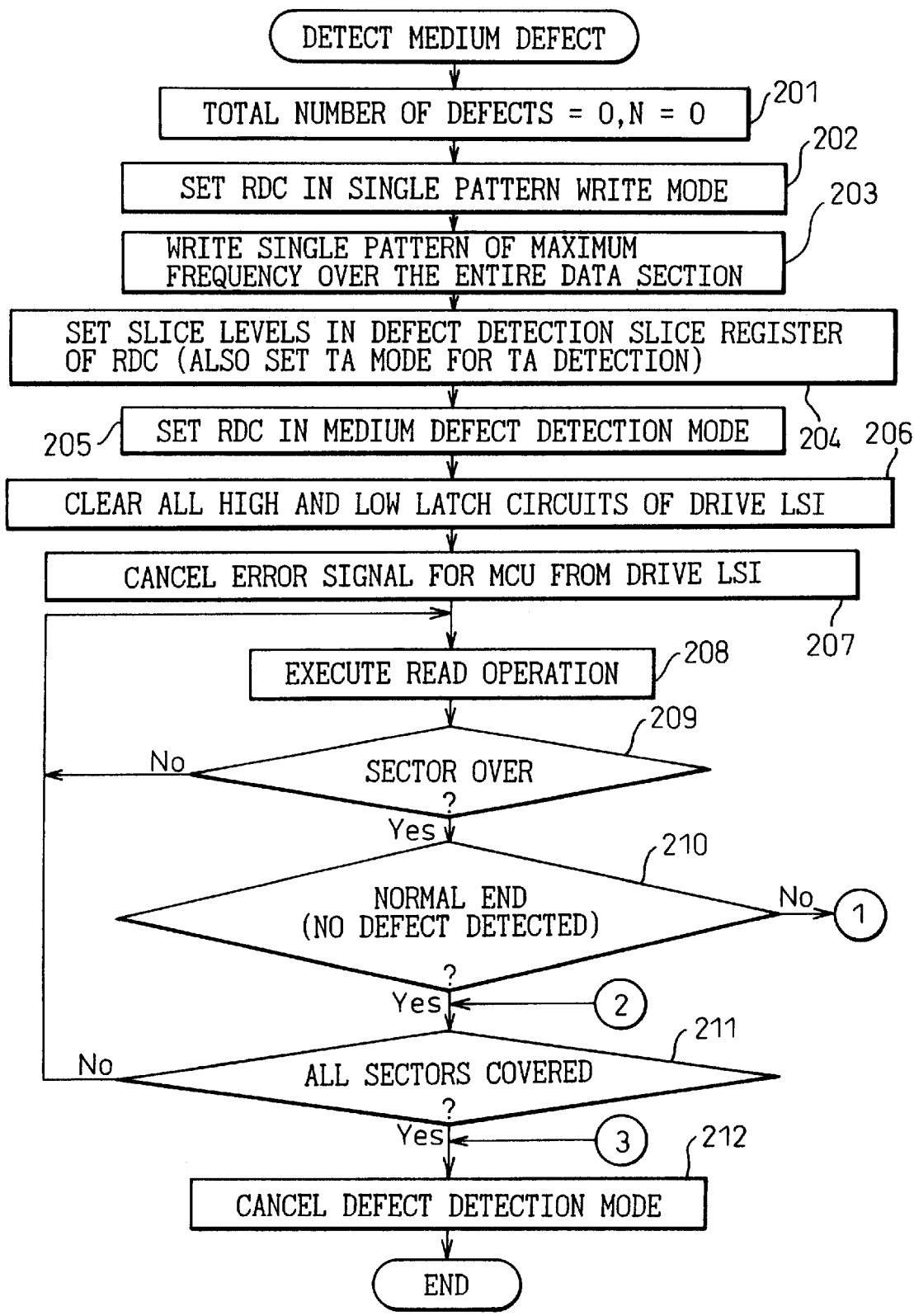

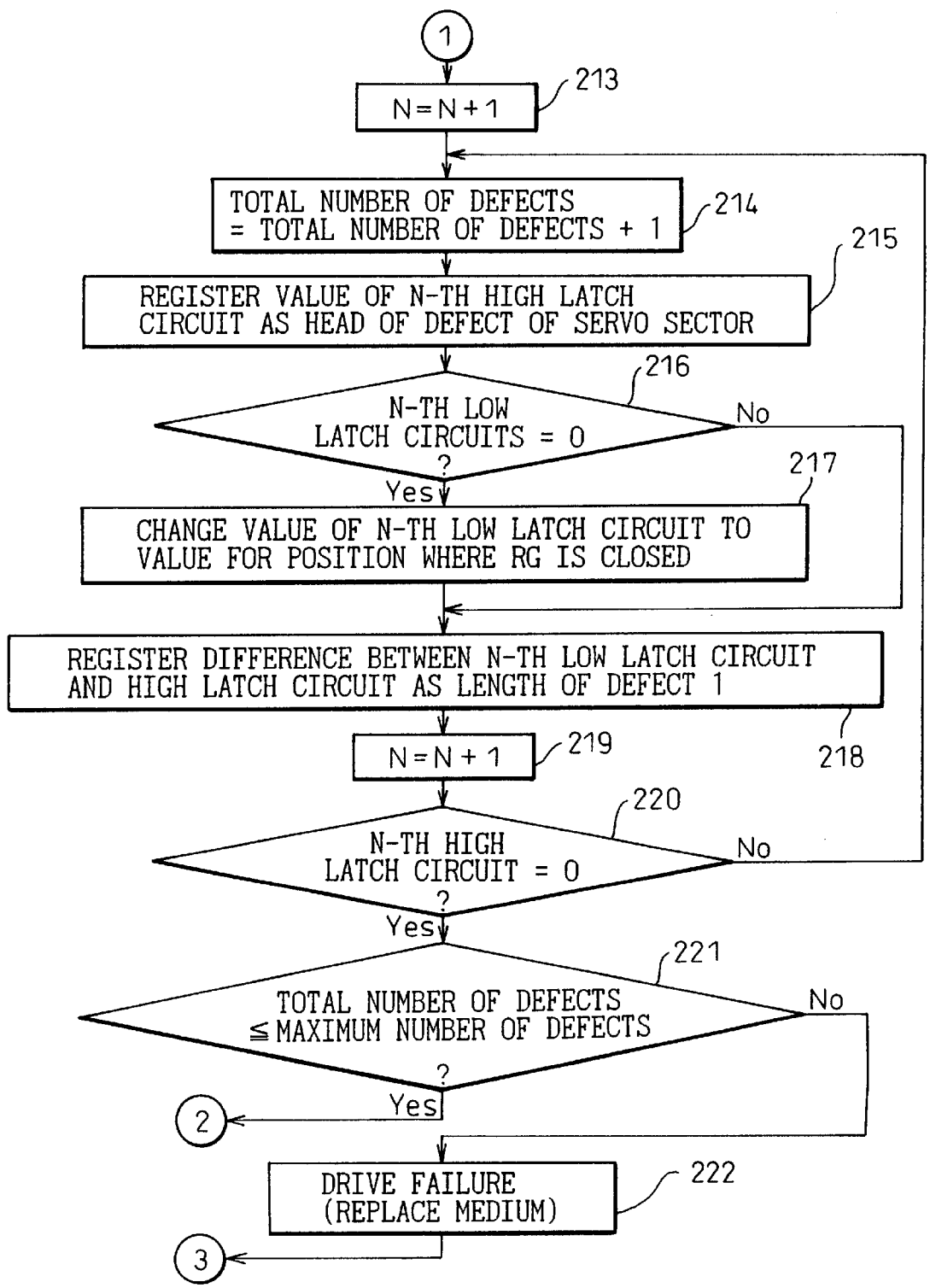

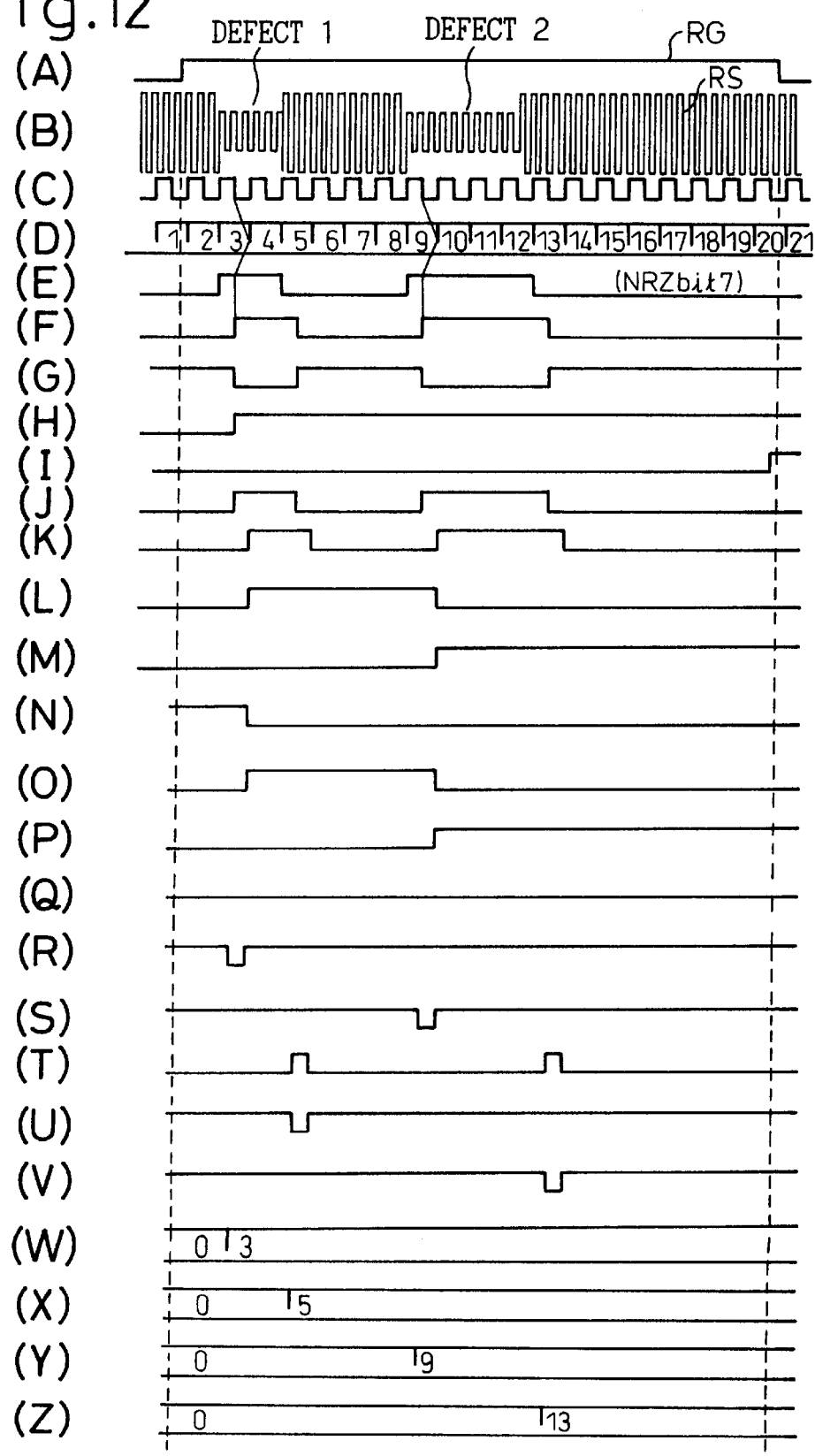

MAGNETIC DISK DRIVE WITH A DISK MEDIUM DEFECT DETECTOR AND READ CHANNEL IC USED IN THE DRIVE

BACKGROUND OF THE INVENTION

1. Field of the Invention

The present invention relates to a magnetic disk drive and to a read channel IC used in the drive or, in particular, to a magnetic disk drive comprising a detector of defects in a disk medium caused by thermal asperity, a missing signal and an extra signal and relates to a read channel IC used for the detector.

2. Description of the Related Art

With the recent improvement in processor capacity and the wide-spread use of multimedia software, demand for a higher speed and a larger capacity magnetic disk drive, constituting a storage device for a computer, has been increasing. In order to improve the recording density of the magnetic disk, the current trend is toward the use of a MR head including a Magneto Resistive (MR) element. On the other hand, a PR4ML (maximum likelihood detection system of partial response class 4) system has come to be employed as a recording/reproduction system. As a result of the increased recording density of the magnetic disk, the flying height of the head has steadily decreased. Also, the rotational speed of the disk medium has increased to meet the requirement for a high data transfer rate. In fact, a magnetic disk having a rotational speed of more than 10,000 rpm has already been introduced.

In the case where a MR head is used with a magnetic disk drive, a phenomenon called thermal asperity occurs in which the medium comes into contact with the head so that the temperature of the MR element changes suddenly to thereby change the resistance value of the MR element. The thermal asperity offsets the head output in a DC fashion, saturates an automatic gain controller (AGC) of a demodulator circuit and makes it impossible to retrieve the required waveform. As a result, the amount of information which cannot be normally demodulated from a medium exceeds the correction ability of an ECC (error correcting code) circuit, thereby leading to the problem of a read error that cannot be corrected.

Some thermal asperities which make the read operation impossible at normal temperature last only a short length of time and can be corrected by ECC. However, other thermal asperities which make the read operation impossible persist for a long time due to the increased height of medium protrusions at high temperatures or due to age deterioration. In the case where a medium defect is detected and registered during a test after manufacture of a magnetic disk drive, therefore, the position of a normal medium defect and the position of a defect due to thermal asperity are required to be registered separately from each other. Further, the recent trend toward a higher data transfer rate has made it impossible to detect minute defects in the medium which have conventionally been detected by extracting the output of the head IC out of the magnetic disk drive. In view of this, a new medium defect detector is required in place of the conventional one.

In the prior art, a defect position has been determined by changing the data to be written in the magnetic disk and the write position thereof and by judging whether a read error occurs when the data is read by the head. Also, the analog read signal that has been read out through the head from the magnetic disk medium is converted into a digital signal and compared with a variable slice level. The portion which exceeds the slice level is detected as a defective portion of the disk medium (Unexamined Patent Publication (Kokai) No. 2-44272).

In the first method of determining a defect position digitally by judging whether a read error occurs or not, however, at least 108 write/read operations are required to determine a defect position on a medium constituting the magnetic disk. It is also difficult to set the proper number of the read/write operations to be executed to detect a medium defect. Another problem is that the type of medium defect, even if detected, cannot be identified.

The medium defects include a "missing" type and an "extra" type in addition to the thermal asperity described above. The "missing" is a defect in which the read signal assumes so low a crest value below a slice level that it cannot be reproduced. The "extra" is a defect in which the read signal, after falling once, rises again due to a flaw on the medium and crosses the slice level twice.

In the method of detecting a medium defect disclosed in Unexamined Patent Publication (Kokai) No. 2-44272, on the other hand, the slice level is raised or lowered in order to determine the pulse position of the read signal subjected to analog-to-digital conversion. This method of medium defect detection, however, poses the problem in that it is impossible to detect that the read signal is offset in DC fashion in one direction due to a thermal asperity.

SUMMARY OF THE INVENTION

Accordingly, the object of the present invention is to solve the above-mentioned problems of the conventional medium inspection method for a magnetic disk drive and to provide a magnetic disk drive capable of determining even the type of a medium defect with a small number of read/write operations and a read channel IC used for such a magnetic disk drive.

In order to achieve the above-mentioned object, according to a first aspect of the invention, there is provided a magnetic disk drive capable of detecting a medium defect from a read signal read from a head, comprising sampling means for sampling the read signal, adder means for calculating the sum of the current sample value and the preceding sample value, comparator means for comparing the sum of the current and preceding sample values with a lower reference value representing a preset lower limit and an upper reference value representing a preset higher limit, and defect detection signal generating means for detecting a portion where the sum of the sample values is lower than the lower reference value and a portion where the sum of the sample values is higher than the higher reference value as a medium defect due to a thermal asperity and generating a defect detection signal.

In order to achieve the above-mentioned object, according to a second aspect of the invention, there is provided a magnetic disk drive capable of detecting a medium defect from a read signal read from a head, comprising sampling means for sampling the read signal, adder means for calculating the sum of the absolute value of the current sample value and the absolute value of the preceding sample value, comparator means for comparing the sum of the absolute value of the current sample value and the absolute value of the preceding sample value with a lower reference value representing a preset lower limit, and defect detection signal generating means for detecting a portion where the sum of the absolute values of the sample values is lower than the lower reference value as a medium defect due to a missing and generating a defect detection signal. The configuration of the invention according to the second aspect is the same as that of the invention according to the first aspect except that the upper reference limit applied to the comparator means in the first aspect is lacking in the second aspect.

In order to achieve the above-mentioned object, according to a third aspect of the invention, there is provided a magnetic disk drive capable of detecting a medium defect from a read signal read from a head, comprising sampling means for sampling the read signal, adder means for calculating the sum of the absolute value of the current sample value and the absolute value of the preceding sample value, comparator means for comparing the sum of the absolute values of the current and preceding sample values with an upper reference value representing a preset upper limit, and defect detection signal generating means for detecting a portion where the sum of the absolute values of the sample values is higher than the higher reference value as a medium defect due to an extra and generating a defect detection signal. This configuration is the same as that of the invention according to the first aspect except that the lower reference limit applied to the comparator means is lacking in the third aspect.

In order to achieve the above-mentioned object, according to a fourth aspect of the invention, there is provided a magnetic disk drive capable of detecting a medium defect from a read signal read from a head, comprising sampling means for sampling the read signal, adder means for calculating the sum of the absolute value of the current sample value and the absolute value of the preceding sample value, comparator means for comparing the sum of the absolute values of the current and preceding sample values with a lower reference value representing a preset lower limit and an upper reference value representing a preset upper limit, and defect detection signal generating means for detecting a portion where the sum of the sample values is lower than the lower reference value as a medium defect due to a missing and a portion where the sum of the sample values is higher than the higher reference value as a medium defect due to an extra and generating a defect detection signal, wherein two types of defects can be detected by a single read operation.

In order to achieve the above-mentioned object, according to a fifth aspect of the invention, there is provided a magnetic disk drive capable of detecting a medium defect from a read signal read from a head, comprising sampling means for sampling the read signal, first adder means for calculating the sum of the current sample value and the preceding sample value, second adder means for calculating the sum of the absolute value of the current sample value and the absolute value of the preceding sample value, first comparator means for comparing the sum of the current and preceding sample values with a first lower reference value representing a preset lower limit and a first upper reference value representing a preset upper limit, second comparator means for comparing the sum of the absolute values of the current and preceding sample values with a second lower reference value representing a preset lower limit and a second upper reference value representing a preset upper limit, and defect detection signal generating means for detecting a portion where the sum of the sample values is lower than the first lower reference value and a portion where the sum of the sample values is higher than the second upper reference value as a medium defect due to a thermal asperity, a portion where the sum of the absolute values of the sample values is lower than the second lower reference value as a medium defect due to a missing, and a portion where the sum of the absolute values of the sample values is higher than the second higher reference value as a medium defect due to an extra and generating a defect detection signal, wherein three types of medium defects can be detected by a single read operation.

The magnetic disk drive according to the first to fifth aspects can detect signal medium defects including the thermal asperity type, missing type and the extra signal type separately from each other with a fewer number of read operations.

According to the present invention, there is also provided a read channel IC used for the magnetic disk drive of the first to fifth aspects described above, comprising sampling means for sampling a read signal, adder means for calculating the sum of the current sample value and the preceding sample value, comparator means for comparing the sum of the current and preceding sample values with a lower reference value representing a preset lower limit and an upper reference value representing a preset upper limit, and defect detection signal generating means for detecting a portion where the sum of the sample values is lower than the lower reference value and a portion where the sum of the sample values is higher than the upper reference value as a medium defect due to a thermal asperity and generating a defect detection signal.

The magnetic disk drive and the read channel IC configured as described above can further comprise defect signal signal correction means for generating a corrected defect detection signal wider than a predetermined width from a defect detection signal. The defect detection signal correction means outputs a corrected defect detection signal at least wider than the width of a period of the next read reference clock in synchronism with the same read reference clock upon application of a defect detection signal thereto. In this way, the pulse width of a defect detection signal can be fetched by the circuit in the subsequent stages. In this case, the positions on a medium corresponding to the start and end of the output of a corrected defect detection signal can be recorded by providing a counter for counting the clocks generated in synchronism with a medium position and a latch for holding the counter value at a change point of the corrected defect detection signal.

The magnetic disk drive and the read channel IC according to the invention can further comprise pseudo-timing detection means for detecting the timing when a read gate signal representing a read operation is false and interrupt control means for initiating an interrupt of a processor for controlling the magnetic disk drive at a false timing and causing the processor to process the defect detection in the case where a defect detection signal is generated from the defect detection signal generating means. In this case, if the medium is normal and free of defects, no interrupt of the processor is initiated, and therefore the processor can continue a process other than medium defect detection.

In the magnetic disk drive and the read channel IC according to the above-mentioned aspects, the efficiency of the medium defect detection is improved if the sampling means samples the read signal asynchronously with the medium signal. Also, even a minute medium defect can be detected if a single data pattern is written in the medium at a maximum writable frequency.

BRIEF DESCRIPTION OF THE DRAWINGS

The present invention will be more clearly understood from the description as set forth below with reference to the accompanying drawings, wherein:

FIG. 10 is a part of a flowchart showing an example process of medium defect detection for a magnetic disk drive according to the invention;

FIG. 11 is a part of a flowchart showing an example process of medium defect detection for a magnetic disk drive according to the invention; and FIG. 12 is a time chart showing the operation of various parts of the drive LSI of FIG. 3.

DESCRIPTION OF THE PREFERRED EMBODIMENTS

Now, specific embodiments of the present invention will be explained in detail with reference to the accompanying drawings.

Figure 1:
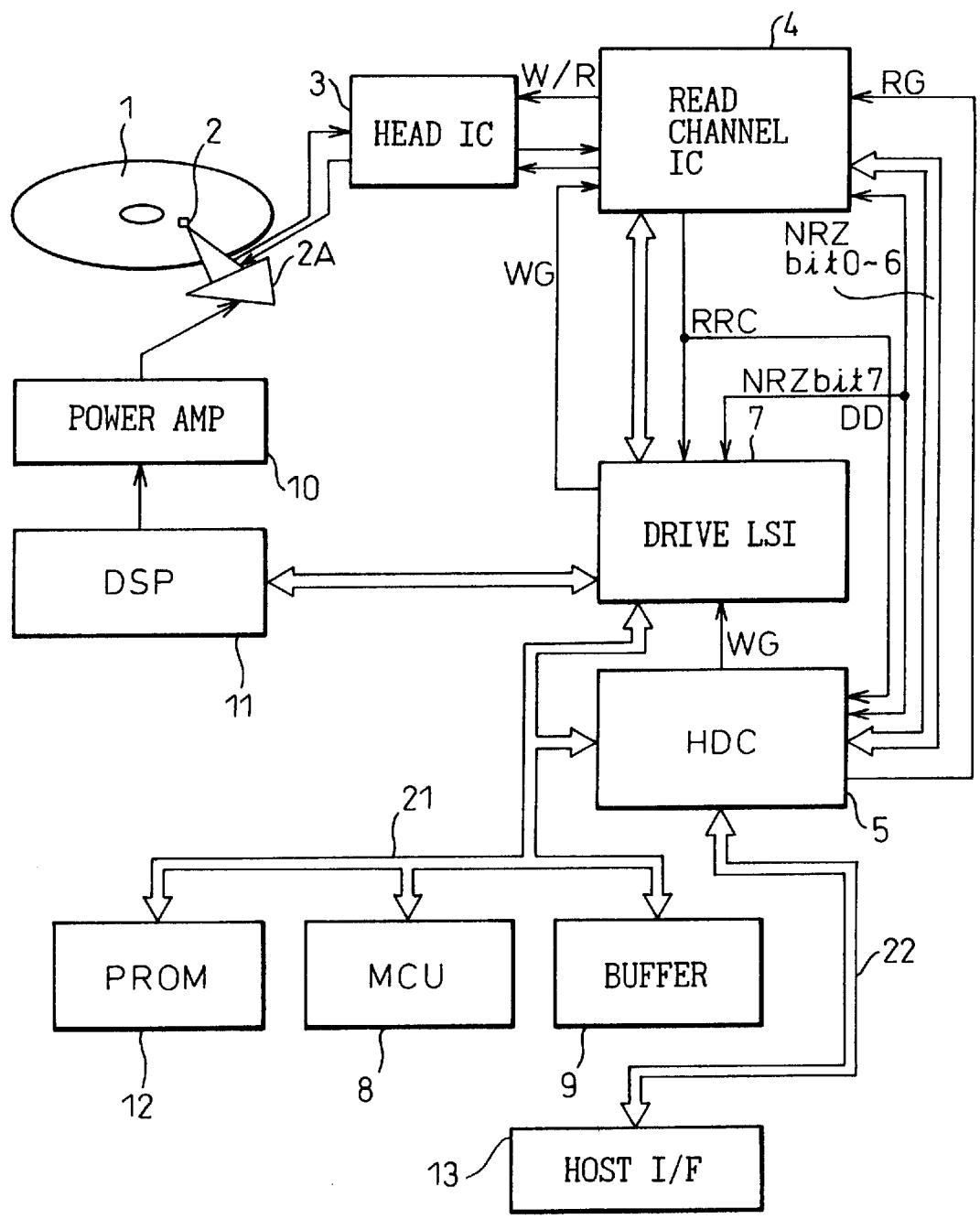
FIG. 1 is a block diagram showing a general configuration of a magnetic disk drive according to the invention.

FIG. 1 shows a general configuration of a medium defect detector for a magnetic disk drive according to the invention. Reference numeral 1 designates a magnetic disk medium. The information on the disk medium 1 is recorded and reproduced by a magnetic head 2 driven by a VCM (voice coil motor) 2A. The read signal from the magnetic head 2 is applied through a head IC3 to a read channel IC 4. The configuration of the read channel IC 4 will be described later.

The read channel IC 4 is connected to a hard disk controller (HDC) 5 and a drive LSI 7. The output of the drive LSI 7 is applied to a digital signal processor (DSP) 11 and returned to the VCM 2A through a power amplifier 10 thereby to control the VCM 2A. The HDC 5 and the drive LSI 7 are connected to a MCU 8, a buffer 9 and a programmable ROM (PROM) 12 through a bus 21. Further, the HDC 5 is connected to a host interface (I/F) 13 through a bus 22.

In FIG. 1, DD designates a defect detection signal, RRC a read reference clock, RG a read gate signal, WG a write gate signal and W/R a write/read signal. In the defect detection mode, NRZ bit7, which is one of the data buses, is assigned to the output of the defect detection signal DD.

Figure 2:
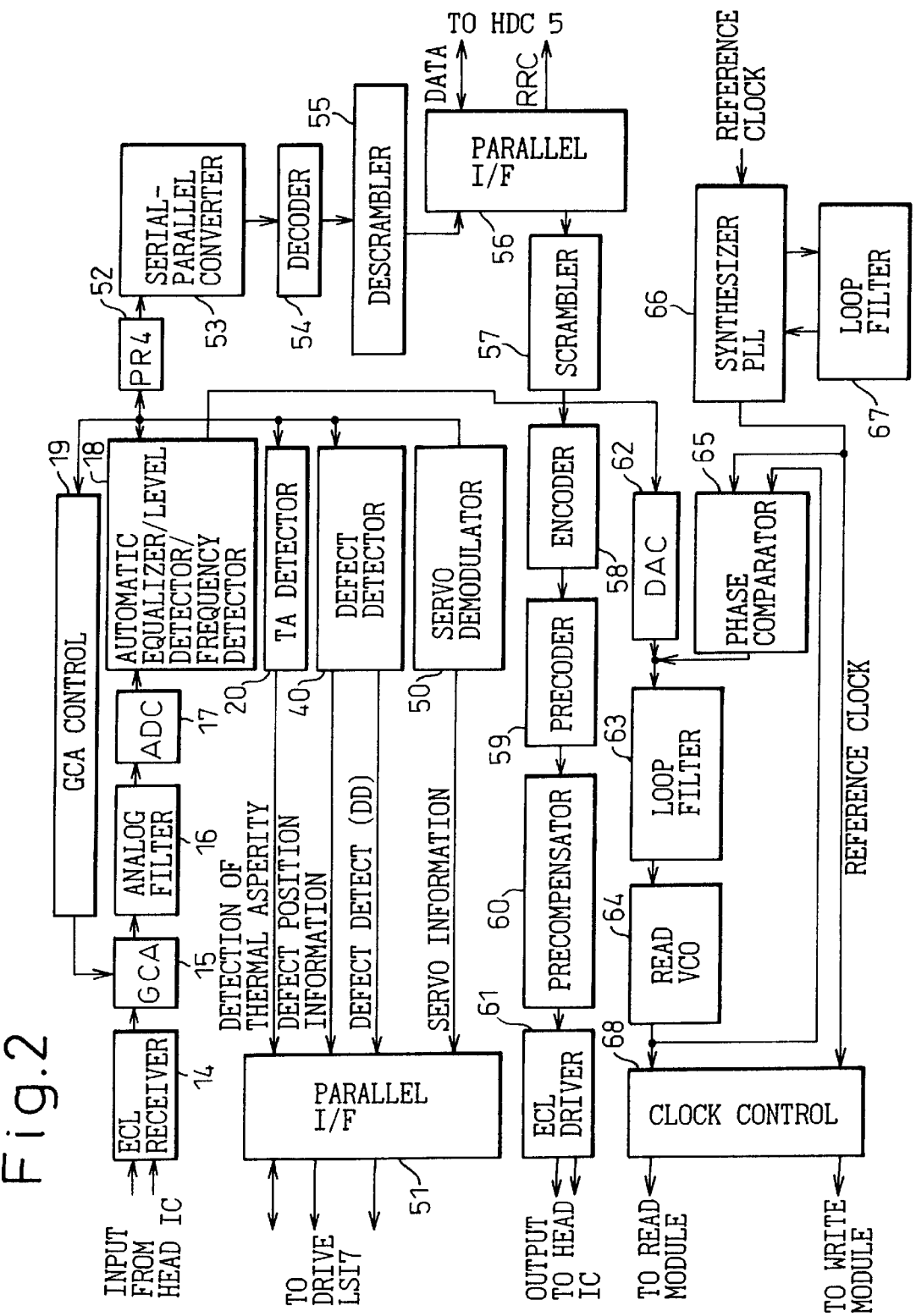
FIG. 2 is a block diagram showing an internal configuration of the read channel IC of FIG. 1.

FIG. 2 shows an internal configuration of the read channel IC 4. The read signal from the head IC is applied through an ECL receiver 14, a gain control amplifier (GCA) 15, an analog filter 16, an A/D converter (ADC) 17 and an automatic equalizer/level detector/frequency detector 18 to a thermal asperity detector 20, a defect detector 40 and a servo demodulation circuit 50. The internal configuration of the defect detector 40 will be explained later. A thermal asperity detection signal from the thermal asperity detector 20, the defect position information and the detection detection signal DD from the defect detector 40 and the servo information from the servo demodulation circuit 50 are applied through a parallel interface (I/F) 51 to the drive LSI 7 and output from the drive LSI 7 to the DSP 11 and the MCU 8.

Also, the output of the automatic equalizer/level detector/frequency detector 18 is fed back to the GCA 15 through a GCA controller 19 on the one hand and output to a partial response class 4 (PR4) circuit 52 on the other hand. The output of the PR4 circuit 52 is applied through a serial-parallel converter 53, a decoder 54 and a descrambler 55 to a parallel interface (I/F) 56 and output to the HDC 5. The output from the parallel I/F 56 to the HDC 5 contains the RRC also.

The write data signal input to the parallel I/F 56 from the HDC 5, on the other hand, is output to the head IC through a scrambler 57, an encoder 58, a precoder 59, a precompensator 60 and an ECL driver 61. The write circuit is not related to the subject of the invention, and will not be described further.

Further, the read channel IC 4 includes a read/write clock circuit. This clock circuit includes a DAC (digital-analog converter) 62 supplied with the output of the automatic equalizer/level detector/frequency detector 18. The output of this DAC 62 is applied through a loop filter 63 and a read VCO 64 to a clock controller 68 and output to a read module and a write module. The output of the read VCO 64 is applied also to a phase comparator 65 for feeding back the phase difference between the output of the read VCO 64 and the reference clock input from a synthesizer PLL 64 to the loop filter 63. The synthesizer PLL 66 is connected with a loop filter 67, and the reference clock applied to the synthesizer PLL 66 is also output to the clock controller 68.

Figure 3:
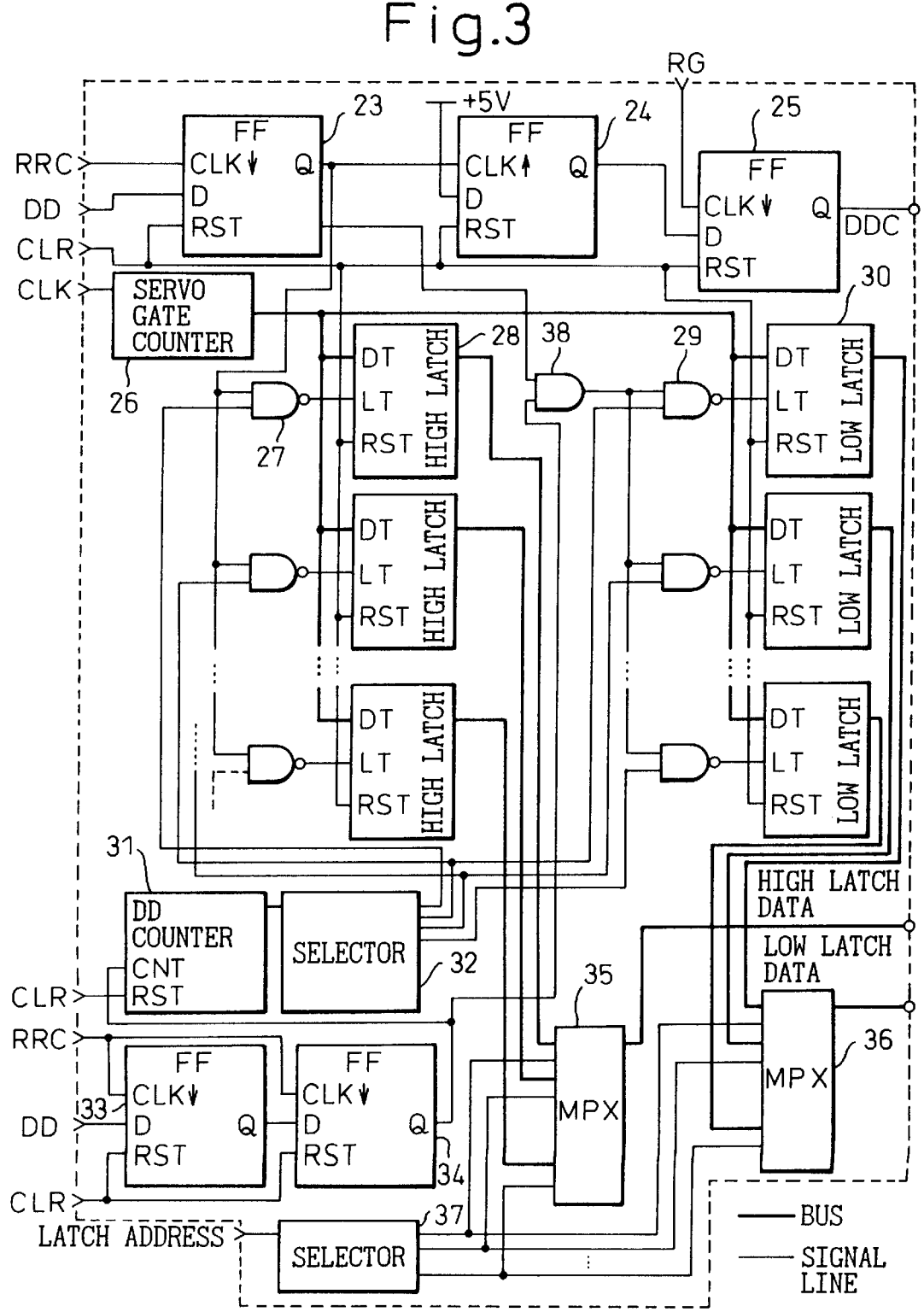
FIG. 3 is a block diagram showing an internal configuration of the drive LSI of FIG. 1.

FIG. 3 shows an internal configuration of the drive LSI 7 of FIG. 1. In FIG. 3, symbols ">" designate input terminals supplied with a read reference clock RRC, a defect detection signal DD, a clear signal CLR, a clock CLK, a read gate signal RG and a latch address signal, respectively, and symbols "0" designate output terminals from which a defect detection signal DDC, a high latch data and a low latch data are output, respectively. The clear signal CLR is a reset signal issued when data is written in a specific address after the MCU reads the defect information. The clock CLK is a system clock for the drive LSI 7.

The drive LSI 7 includes a plurality of flip-flops (FF) 23, 24, 25, 33, 34, a servo counter 26, N high latch circuits 28 and N NAND circuits 27 inserted in the stage preceding thereto, N low latch circuits 30 and N NAND circuits 29 in the stage preceding thereto, a defect detection signal DD counter 31, selectors 32, 37, two multiplexers (MPX) 35, 36, and an AND circuit 38, which are connected in the manner shown. The solid lines in FIG. 3 designate buses, and thin lines designate signal lines.

The FF 23 is supplied with the read reference clock RRC and the defect detection signal DD and produces from an output terminal Q thereof the level of the defect detection signal DD at the trailing edge of the read reference clock RRC. When the output of the FF 23 goes high, the FF 24 has the function of latching the output thereof to high level until the clear signal is input to the reset terminal RST. Further, the FF 25 fetches the output of the FF 24 at the trailing edge of the read gate signal RG, and outputs a corrected defect detection signal to the MCU when the output of the FF 24 is high. This defect detection signal DDC is a multiple of the frequency of the defect detection signal DD.

A servo gate counter 26 supplied with the clock CLK, on the other hand, is for measuring the time since the servo gate signal. The NAND circuits 27 are for selecting a trigger for latching the leading edge of the defect detection signal DD, and the high latch circuits 28 are for latching the leading edge of the defect detection signal DD. In similar fashion, the NAND circuits 29 are for selecting a trigger for latching the trailing edge of the defect detection signal DD, and the low latch circuits 30 are for latching the trailing edge of the defect detection signal DD. The AND circuit 38 is for producing a fetch signal for the low latch circuits 30. The high latch circuits 28 and the low latch circuits 30 operate in such a manner as to hold the value of the DT terminal when the LT terminal is low.

The DD counter 31 is for counting the number of times the defect detection signal DD goes high. The selector 32 is for producing a select signal as to which high latch circuit 28 or which low latch circuit 30 is to be selected from the output of the counter 31. The output of the selector 32 is configured so that the signal applied to a selected latch goes high and operates with the same logic as an AND circuit. Also, the FF 33 and the FF 34 function to delay the input read reference clock RRC by one clock. Further, the MPX 35 is for selecting the rising point of the output from the N high latch circuits 28 and outputs it as a high latch data. The MPX 36, on the other hand, is for selecting the falling point of the output from the N low latch circuits 30 and outputs it as a low latch data. Further, the selector 37 is for selecting which defect information to be output.

Figure 4:
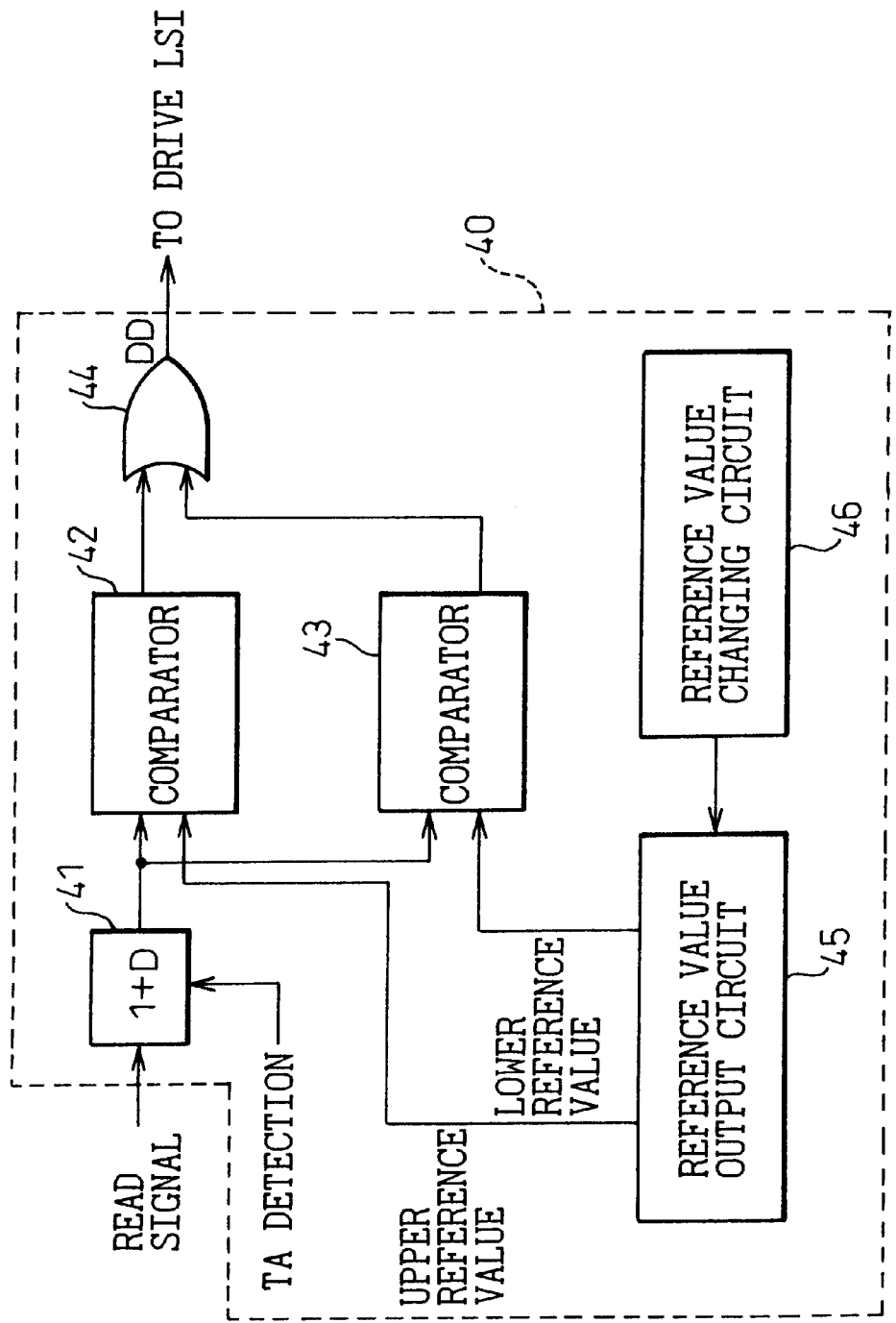
FIG. 4 is a block diagram showing an internal configuration of the defect detector of FIG. 2.

FIG. 4 shows an internal configuration of the defect detector 40 of FIG. 2. The medium defect detector 40 uses a (1+D) calculation circuit indispensable for demodulating the PR4ML (maximum likelihood detection of the partial response class 4). The read signal is applied to the this (1+D) calculation circuit 41. The output of the (1+D) calculation circuit 41 branches into two paths, one of which is applied to the comparator 42 supplied with the upper reference value, and the other to the comparator 43 supplied with the lower reference value. The upper reference value and the lower reference value (slice levels) which are output from the reference value output circuit 45 are variable by a reference value changing circuit 46.

The comparators 42 and 43 output a defect detection signal to an OR circuit 44 in the case where the output from the (1+D) calculation circuit 41 exceeds a slice level. The OR circuit 44 outputs a defect detection signal DD to the drive LSI 7 in synchronism with the read reference clock RRC. In the drive LSI 7, the starting point where the defect detection signal DD goes true and the length for which it remains true are recorded by a circuit having the above-mentioned configuration (the counter 31, the high latch circuit 28, the low latch circuit 30, etc.) thereby to specify the position and the magnitude of the medium defect.

The operation of the defect detector 40 shown in FIG. 4 and the operation of the drive LSI 7 shown in FIG. 3 will be explained with reference to FIGS. 5 to 7 describing the cases where the medium defect is a missing signal, an extra signal and a thermal asperity, respectively.

Figure 5:
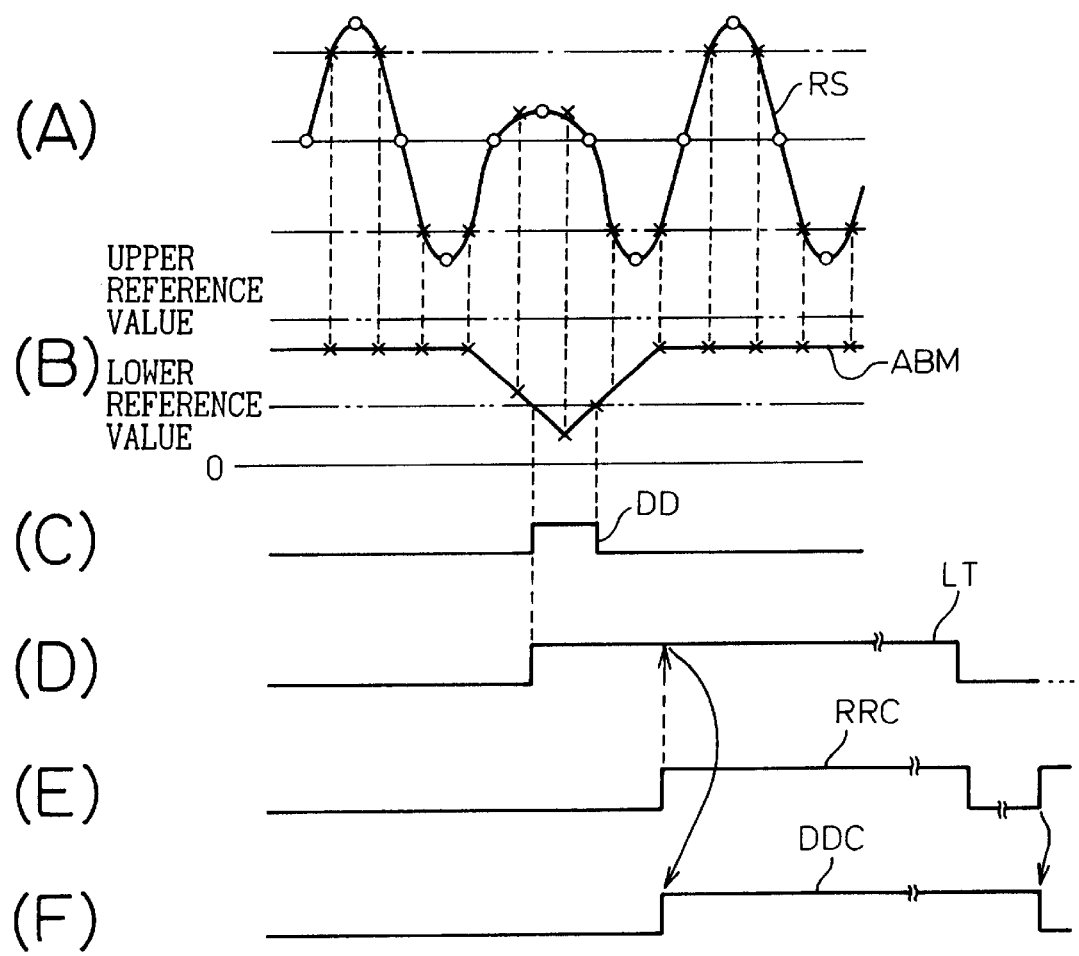
FIG. 5 is a time chart for explaining the operation of defect detection in a magnetic disk drive according to the invention when the medium defect is a missing.

FIG. 5 is a time chart for explaining the operation of defect detection by the medium defect detector of a magnetic disk drive according to the invention in the case where the medium defect is a missing signal.

For detecting a missing signal constituting a medium defect, the read channel IC 4 described with reference to FIGS. 1 and 2 is set in defect detection mode. When the read gate goes true, the defect detector 40 of the read channel IC4 is actuated without executing the normal read operation. Upon application of a read signal RS (=input of ADC) as shown in FIG. 5(A) to the ADC 17 shown in FIG. 2, the ADC 17 samples the signal asynchronously with a synthesizer clock without synchronizing the read signal RS.

The absolute value of the sampled data is determined, and the value (1+D) for this data is calculated by the (1+D) calculation circuit 41 of the defect detector 40. In this calculation, the absolute value of the current sample value is added to the absolute value of the preceding sample value. In the case where the medium has a missing signal, the read signal RS has a portion low in crest value. As a result, the calculation result (1+D) assumes a waveform ABM, as shown in FIG. 5(B), containing a portion lower than the lower reference value. In the case where the waveform ABM, as shown in FIG. 5(B), contains a portion lower than the lower reference value, the output of the comparator 43 goes high, and a defect detection signal represented by the waveform DD shown in FIG. 5(C) is output from the OR circuit 44. This signal is input to the drive LSI 4 in synchronism with the read reference clock.

In the drive LSI 4, the FFs 23, 24 produce a latch signal LT using the defect detection signal DD as shown in FIG. 5(D). This latch signal LT is for extending the pulse width of the defect detection signal DD. The reason why the pulse width of the defect detection signal DD is increased by the latch signal LT in this way is in order to increase the pulse width beyond a predetermined length to make the fetch possible in subsequent stages. In this case, the pulse width of the defect detection signal DD can be increased to at least one period of the read reference clock RRC as shown in FIG. 5(E). Then, in the case where the medium has a missing, the latch signal LT indicating a missing signal can always be fetched at the leading edge of RRC, and the corrected defect detection signal DDC shown in FIG. 5(F) can be produced.

Figure 6:
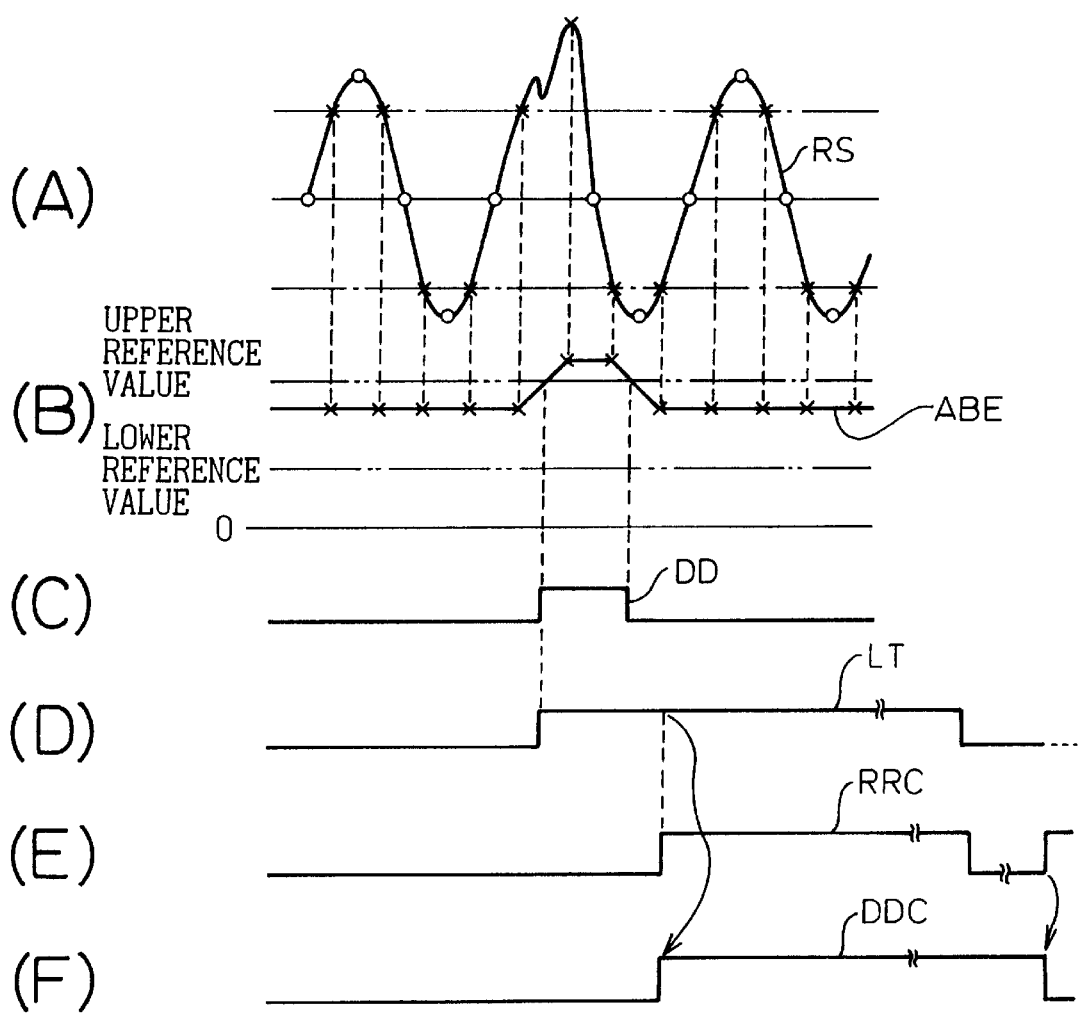
FIG. 6 is a time chart for explaining the operation of defect detection in a magnetic disk drive according to the invention when the medium defect is an extra.

FIG. 6 is a time chart for explaining the operation of defect detection for a medium defect detector of a magnetic disk drive according to the invention in the case where the defect is an extra signal.

An extra signal constituting a medium defect can be a detected in the same manner as a missing signal is detected as described in FIG. 5. In the case where a read signal RS as shown in FIG. 6(A) is applied to the ADC 17 of FIG. 2, the ADC 17 samples the signal with a synthesizer clock without synchronizing the read signal RS. The absolute value of the data sampled is determined, and the (1+D) calculation is effected by the (1+D) calculation circuit 40 and the (1+D) calculation circuit 41 using the data.

In the case where the medium has an extra as a defect, on the other hand, the read signal RS contains a portion with a high crest value. As a result, the calculation result of (1+D) assumes a waveform ABE shown in FIG. 6(B) containing a portion higher than the upper reference value. In the case where the waveform ABE contains a portion higher than the upper reference value this way, the output of the comparator 42 goes high, and the OR circuit 44 produces a defect detection signal indicated, in FIG. 6(C), by the waveform DD. This signal is applied to the drive LSI 4 in synchronism with the read reference clock.

The FFs 23, 24 in the drive LSI 4 produce latch signals LT shown in FIG. 6(D) in response to the defect detection signal DD. As a result, in the presence of a defect extra, the latch signal LT indicating an extra signal is fetched at the leading edge of the read reference clock RRC shown in FIG. 6(E) thereby to produce a corrected defect detection signal as shown in FIG. 6(F).

Figure 7:
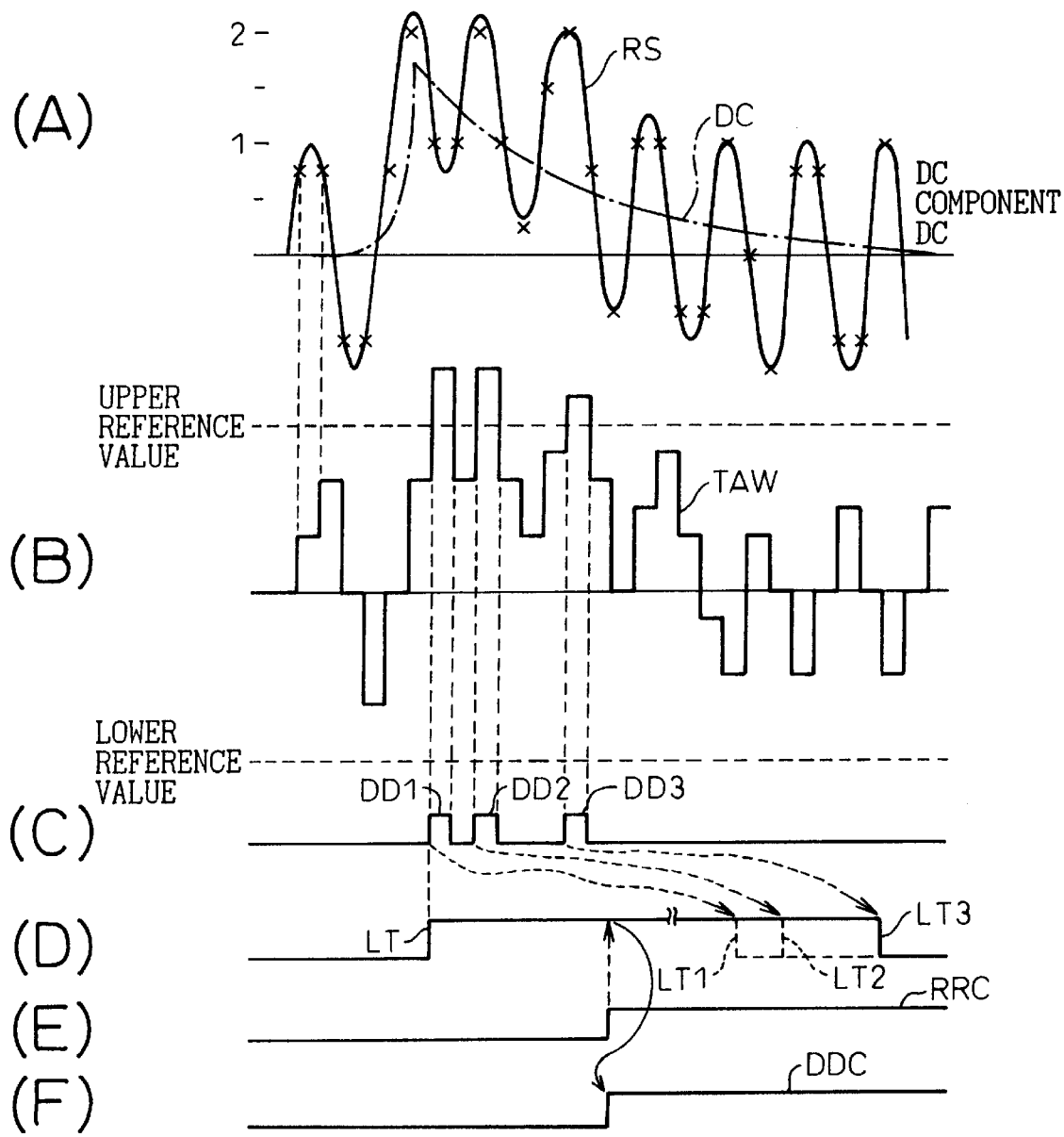
FIG. 7 is a time chart for explaining the operation of defect detection in a magnetic disk drive according to the invention when the medium defect is a thermal asperity.

FIG. 7 is a time chart for explaining the operation of defect detection in the medium defect detector for a magnetic disk drive according to the invention in the case where the medium defect is a thermal asperity.

A thermal asperity type defect, which constitutes a medium defect, can be detected by following substantially the same steps as when a missing signal or an extra signal is detected as described with reference to FIGS. 5 and 6 except that the absolute values of the sample values are not used for the adding calculation.

In the case where a thermal asperity occurs in a magnetic disk medium, a direct-current component DC indicated by one-dot chain is added to the read signal RS, which is then shifted in a positive or a negative direction by the direct-current component DC. In the case where the read signal RS as shown in FIG. 7(A) is applied to the ADC 17, the ADC 17 samples the signal asynchronously with a synthesizer clock without synchronizing the read signal RS. The data thus sampled are applied to the (1+D) calculation circuit 41 of the defect detector 40 in the form of a signed value not assuming any absolute value thereby to calculate (1+D). This is because the DC component of the read signal undergoes a change and detection is possible from a signed sample value when a thermal asperity occurs.

In the case where a thermal asperity occurs in the medium, the read signal RS contains a portion shifted in a positive or a negative direction. In the cited case, the read signal RS contains a portion shifted in a positive direction. As a result, the calculation result (1+D) assumes a waveform TAW in FIG. 7(B) having a portion higher than the upper reference value. In the case where the waveform TAW contains a portion higher than the upper reference value in this way, the output of the comparator 42 goes high and the OR circuit 44 outputs a defect detection signal represented by the waveform DD. This signal is applied to the drive LSI 4 in synchronism with the read reference clock.

In the drive LSI 4, the latch signal LT is produced by FFs 23, 24 in response to the defect detection signal DD. In the cited case, a pulse of the defect detection signal DD is generated at three points due to a thermal asperity as shown in FIG. 7(C). In such a case, the trailing edge of the latch signal assumes a waveform LT1 due to the first defect detection signal DD1 as shown in FIG. 7(D). In the presence of the second defect detection signal DD2, however, the latch signal is was extended to the waveform LT2. Further, the presence of the next following third defect detection signal DD3 extends the latch signal to the waveform LT3 finally. In this fashion, even in the presence of a thermal asperity in the medium, the latch signal LT indicating an extra is fetched at the leading edge of the read reference clock RRC thereby to produce a corrected defect detection signal DDC as shown in FIGS. 7(E) and (F).

In the above-mentioned detection of a medium defect, the levels of the upper and lower reference values can be set in the comparators 42, 43 by the processor. Also, the outputs of the comparators 42, 43 can be masked by being set by the processor to output only one of the outputs of the comparators 42, 43. A missing signal can be detected by validating only the comparator 42 in which the lower reference value is set, while an extra signal can be detected by validating only the comparator 43 in which the upper reference value is set.

Figure 8:
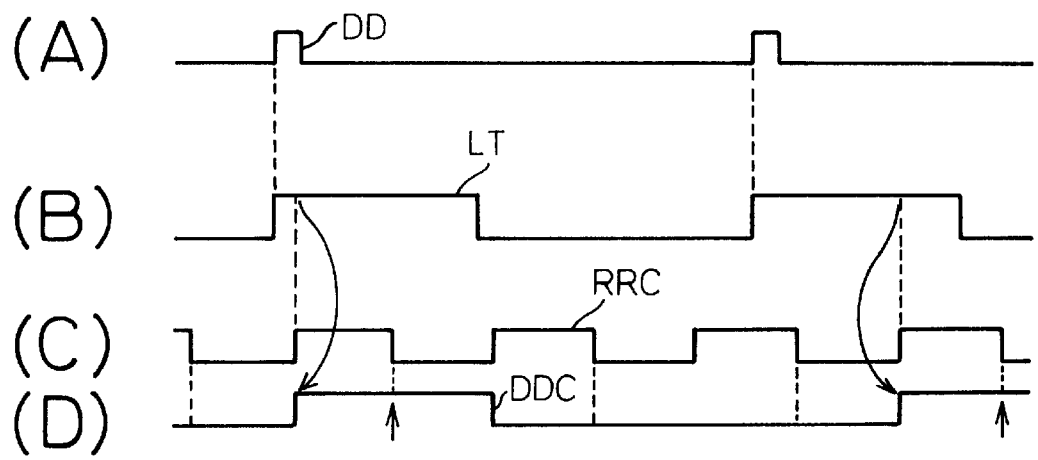
FIG. 8 is a time chart for explaining the timing of fetching a first defect detection signal in the drive LSI.

FIG. 8(A) shows a timing at which the defect detection signal DD is fetched by the drive LSI 4. In the case where the medium has defects at a plurality of points, the defect detection signal DD also appears at a plurality of points. Then, a latch signal LT (FIG. 8(B)) having a pulse width equal to or larger than one period of the read reference clock RRC (FIG. 8(C)) is produced in the drive LSI 4. Thus a defect detection signal DDC (FIG. 8(D)) with the latch signal LT corrected at high level rises at a timing corresponding to the leading edge of the read reference clock RRC. The trailing edge of the corrected defect detection signal DDC occurs at the same time point as the leading edge of the next read reference clock RRC.

Figure 9:
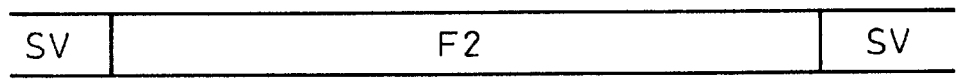
FIG. 9 is a diagram for explaining an example format for the defect detection mode of an embedded servo system.

FIG. 9 shows an example format of the signal for the defect detection mode assuming an embedded servo system. SV designates a servo frame, and all the data frames F2 between the servo frames SV are written in by the measurement pattern write function (8/9 ENC, precoder bypass). In the process, a pattern not containing an SB (sync byte) or a training section is used for write operation.

Various mode settings of the read channel IC 4 for detection of a medium defect are shown below.

(1) Defect detection mode

Once this mode is set, the normal read operation is not performed but the sampling is effected by the synthesizer clock, and (1+D) is calculated using the absolute value of the sample valves. The result of calculation is compared with the upper reference value and the lower reference value, and if it exceeds any one of the reference values, a NRZ defect detection signal DD is raised to "1" in synchronism with the read reference clock RRC.

(2) Thermal asperity detection mode

The (1+D) calculation is effected with a signed number upon detection of a defect.

(3) Upper reference value mask mode

The result of comparison between the (1+D) calculation result and the upper reference value is masked.

(4) Lower reference value mask mode

The result of comparison between the (1+D) calculation result and the lower reference value is masked.

(5) Upper reference value setting mode

An upper reference value to be compared with the (1+D) calculation result is set.

(6) Lower reference value setting mode

A lower reference value to be compared with the (1+D) calculation result is set.

The medium defect detector for a magnetic disk drive according to the invention is for inspecting the medium before shipment after manufacture of the magnetic disk drive, and is arranged not to operate unless one of the modes (1) to (6) is set. As a result, a wasteful power consumption can be avoided.

FIGS. 10 and 11 are flowcharts showing the process of medium defect detection by a medium defect detector of a magnetic disk drive described above.

First, in step 201, the total number of medium defects and both the numbers N of the high latch circuits and the low latch circuits are set to zero. In the next step 202, the read channel IC (RDC) is set in single pattern write mode, followed by step 203 where a single pattern of maximum frequency is written on the front of the data section of the disk medium. In the next step 204, slice levels (upper reference value and lower reference value) are set in the defect detection slice register of the RDC. In the case under consideration, the slice levels are changed according to the type of defect to be detected. At the same time, a thermal asperity mode is also set if the same is to be detected.

In step 205, the RDC is set in the medium defect detection mode, followed by step 206 where all the high latch circuits and the low latch circuits of the drive LSI are cleared. In step 207, the error signal for the MCU from the drive LSI is canceled.

Upon complete setting this way, the medium is read in step 208. The next step 209 is for judging whether a sector of the medium is fully covered or not. In the case where the medium sector is yet to be covered, the process returns to step 208 for continuing the read operation. Upon complete coverage of a particular sector, on the other hand, the process proceeds to step 210 for judging whether the medium sector is normally covered or not, that is, whether no defect is detected. In the case where no defect is detected in the sector, the process proceeds to step 211 for judging whether all the sectors have been read or not. In the case where all the sectors have been read, step 212 cancels the defect detection mode and terminates this routine. In the case where all the sectors have yet to be read, on the other hand, the process returns to step 208 and the remaining sectors continue to be read.

In the presence of a defect in the medium, step 210 judges whether the process is terminated abnormally and the process proceeds to step 213. In step 213, 1 is added to the N high latch circuits and the N low latch circuits, respectively. The numbers in the high latch circuits and the low latch circuits are set in step 201. The numbers in the high latch circuits and the low latch circuits thus assume 1 when the process proceeds to step 213 for the first time. In step 214, 1 is added to the total number of medium defects. Since the total number of medium defects is set to zero in step 201, the total number of medium defects is 1 when the process proceeds to step 214 for the first time.

In step 215, the value of the N-th high latch circuit is registered as the head of the defect of the servo sector. The next step 216 judges whether the value of the N-th low latch circuit is zero or not. In the case where the value of the N-th low latch circuit is zero, the process proceeds to step 217 for changing the value of the N-th low latch circuit to a value associated with the position where the read gate is closed. This process is for setting the last value of the sector as a defect terminating point in the absence of a value in the low latch circuits in the case where defects continue to the end of the servo sector. In the case where the judgment in step 216 is that the value in the N-th low latch circuit is not zero, the process proceeds to step 218. In step 218, the difference between the N-th low latch and the N-th high latch circuit is the length of the defect. In step 219, 1 is added to the number N of the high latch circuit and the low latch circuit, followed by step 220 for judging whether the N-th high latch circuit assumes a value of zero or not. In the case where the value of the N-th latch circuit is zero, the process proceeds to step 221, while when the value of the N-th latch circuit is not zero, the process returns to step 214.

Step 221 judges whether the total number of defects of the medium is not more than the maximum number of defects allowable for the particular medium. In the case where the defects are not more than the maximum number, the process proceeds to step 211 for judging whether the read operation is complete for all the sectors. In the case where the total number of defects exceeds the maximum number, the process proceeds to step 222 and further to step 212 indicating that the medium involved is defective, i.e. it has so many defects that it cannot be used any more and is required to be replaced. In step 212, the defect detection mode is canceled and the routine is ended.

In the presence of a defect in the medium, the length of the portion associated with the particular defect is registered and prevented from use. In the case where the total number of defects exceeds an allowable number of defects of the medium involved, the area usable is so small that an instruction is given to replace the medium as defective.

Now, the operation of the drive LSI 4 will be explained with reference to FIG. 12.

In FIG. 12, (A) denotes a read gate signal RG, (B) denotes a read signal, (C) denotes a read reference signal RRC, (D) denotes an output signal of the counter 26, (E) denotes a defect detection signal DD, (F) denotes an output signal Q of the flip-flop 23, (G) denotes an inverted output signal Q of the flip-flop 23, (H) denotes an output signal of the flip-flop 24, (I) denotes a corrected defect detection signal, (J) denotes an output signal of the flip-flop 33, (K) denotes an output signal of the flip-flop 34, (L) denotes a first output OUT0 of the DD counter 31, (M) denotes a second output OUT1 of the DD counter 31, (N) denotes a first output of the selector 32, (O) denotes a second output of the selector 32, (P) denotes a third output of the selector 32, (Q) denotes a fourth output of the selector 32, (R) denotes an input signal of the of terminal LT of the first high-latch, (S) denotes an input terminal LT of the second high-latch, (T) denotes an output signal of the AND circuit 38,(U) denotes an input signal of the terminal LT of the first low latch, (V) denotes an input signal of the terminal LT of the second low latch, (W) denotes an output signal of the first high latch, (X) denotes an output signal of the first low latch, (Y) denotes an output signal of the second high latch, and (Z) denotes an output signal of the second low latch.

In the presence of a missing signal in the medium, the amplitude of the read signal RS is abnormally reduced. This defect is detected by the defect detector 40 of the read channel IC described above (FIG. 4), so that the defect detection DD from the read channel IC goes high in synchronism with the read reference clock RRC. The point where the defect detection signal DD goes high and the point where it goes low are recorded in the register, thus making is possible to determine the point and size of the medium defect.

The flip-flop 23 fetches the defect detection signal DD at the trailing edge of the read reference clock RRC. The output of the flip-flop 24 is a signal indicating that a defect has occurred, and the corrected defect detection signal DDC is a signal representing the output of the flip-flop 24 fetched at the trailing edge of the read gate signal RG. The character Out0 of the DD counter 31 is an output of bit 0, and Out1 is an output of bit 1. When both Out0 and Out1 of the DD counter 31 are low, therefore, the output value of the DD counter 31 is 0. When Out0 is high and Out1 is low, the output value of the DD counter 31 is 1. When Out0 is low and Out1 is high, the output value of the DD counter 31 is 2.

Assuming that the n-th high latch circuit 26 is called a high latch n, the high latch 1 latches the output of the counter 26 when the LT input thereof goes low. Thus the output of the high latch 1 becomes 3, and the high latch 2 latches the output of the counter 26 when the LT input thereof goes low, and therefore the output of the high latch 2 becomes 5. In similar fashion, assuming that the n-th low latch circuit 30 is called a low latch n, the low latch 1 latches the output of the counter 26 when the LT input thereof goes low. Therefore, the output of the low latch 1 becomes 5. The low latch 2 latches the output of the counter 26 when the LT input thereof goes low, and therefore the output of the low latch 2 becomes 13.

In actual circuits, a plurality of defects existing in each read gate can be detected by provision of a counter that can count the time (the time when the read gate signal RG is high) when the read gate is open, a plurality of latches for recording the value of the counter when the data bus goes high between the read channel IC 4 and the HDC 5 where defect information is output, and a plurality of latches for recording the value on the counter when the same data bus goes low.

It will thus be understood from the foregoing description that the present invention comprising an (1+D) calculation circuit originally built in a read channel IC has the function of switching the calculation of the output of an A/D converter as an absolute value or a signed value and the function of comparing the (1+D) calculation result with a reference value. Consequently, it is possible to check what defect is located where in a medium within a short time, thereby greatly contributing to an improved producibility and reliability of a magnetic disk drive.

What is claimed is:

1. A magnetic disk drive capable of detecting a defect of a medium from a read signal read out of a head, comprising:

sampling means for sampling said read signal;

calculation means for calculating by using the current sample value and the preceding sample value, said calculation means includes adder means for calculating the sum of the current sample value and the preceding sample value, wherein the calculation result is capable of being a positive value or a negative value;

comparator means for comparing the calculation results obtained by said calculation means with predetermined reference values, whereby said comparator means compares the sum of the current sample value and the preceding sample value with a lower reference value representing a preset lower limit and an upper reference value representing a present upper limit; and defect detection signal generating means for detecting a type of defect in accordance with the comparison results obtained by said comparator means, whereby said defect detection signal generating means detects a portion where the sum of said sample values is lower than said lower reference value and a portion where the sum of said sample values is higher than said upper reference value as a medium defect due to a thermal asperity and generating a defect detection signal.

2. A magnetic disk drive according to claim 1, further comprising:

second calculation means including second adder means for calculating the sum of the absolute value of the current sample value and the absolute value of the preceding sample value;

second comparator means for comparing the sum of the absolute value of the current sample value and the absolute value of the preceding sample value with a lower reference value representing a preset lower limit; and said defect detection signal generating means detects a portion where the sum of the absolute values of said sample values is lower than said lower reference value as a medium defect due to a missing and generating a defect detection signal.

3. A magnetic disk drive according to claim 1, further comprising:

second calculation means including second adder means for calculating the sum of the absolute value of the current sample value and the absolute value of the preceding sample value;

second comparator means for comparing the sum of the absolute value of the current sample value and the absolute value of the preceding sample value with an upper reference value representing a preset upper limit; and said defect detection signal generating means where the sum of the absolute values of said sample values is higher than said upper reference value as a medium defect due to an extra and generating a defect detection signal.

4. A magnetic disk drive according to claim 1, further comprising defect detection signal correcting means for generating a corrected defect detection signal having a pulse width larger than a predetermined width that can be fetched by the circuits in subsequent stages.

5. A magnetic disk drive according to claim 4, wherein said defect detection signal correcting means outputs a corrected defect detection signal having a pulse width at least equal to one period of the next read reference clock in synchronism with said next read reference clock upon application of said defect detection signal thereto.

6. A magnetic disk drive according to claim 5, further comprising a counter for counting the clocks generated in synchronism with the position of said medium, and at least a latch for holding the value of said counter at a point where said corrected defect detection signal undergoes a change, wherein the positions on said medium corresponding to the start and end of output of said corrected defect detection signal can be recorded.

7. A magnetic disk drive according to claim 1, further comprising means for changing said reference value.

8. A magnetic disk drive according to claim 1, further comprising means for detecting a pseudo timing when a read gate signal representing the read operation becomes false, and interrupt control means for initiating an interrupt of a processor for controlling the magnetic disk drive at said pseudo timing and causing said processor to execute the process for defect detection in the case where a defect detection signal is generated from said defect detection signal generating means.

9. A magnetic disk drive according to claim 1, wherein said sampling means samples said read signal asynchronously with a medium signal.

10. A magnetic disk drive according to claim 1, wherein a single data pattern is written in said medium with a maximum writable frequency.

11. A read channel IC used for a magnetic disk drive capable of detecting a defect of a medium from a read signal read out of a head, comprising:

sampling means for sampling said read signal;

calculation means for calculating by using the current sample value and the preceding sample value, whereby said calculation means includes adder means for calculating the sum of the current sample value and the preceding sample value, whereby the calculated result is capable of being a positive value or a negative value;

comparator means for comparing the calculation results obtained by said calculation means with predetermined reference values, said comparator means compares the sum of the current sample value and the preceding sample value with a lower reference value representing a preset lower limit and an upper reference value representing a present upper limit; and defect detection signal generating means for detecting a type of defect in accordance with the comparison results obtained by said comparator means, whereby said defect detection signal generating means detects a portion where the sum of said sample values is lower than said lower reference value and a portion where the sum of said sample values is higher than said upper reference value as a medium defect due to a thermal asperity and generating a defect detection signal.

12. A magnetic disk drive according to claim 11, further comprising:

second calculation means including second adder means for calculating the sum of the absolute value of the current sample value and the absolute value of the preceding sample value;

second comparator means for comparing the sum of the absolute value of the current sample value and the absolute value of the preceding sample value with a lower value representing a preset lower limit; and said defect detection signal generating means detects a portion where the sum of the absolute values of said sample values is lower than said lower reference value as a medium defect due to a missing and generating a defect detection signal.

13. A magnetic disk drive according to claim 11, further comprising:

second calculation means including second adder means for calculating the sum of the absolute value of the current sample value and the absolute value of the preceding sample value;

second comparator means for comparing the sum of the absolute value of the current sample value and the absolute value of the preceding sample value with an upper reference value representing a preset upper limit; and said defect detection signal generating means detects a portion where the sum of the absolute values of said sample values is higher than said upper reference value as a medium defect due to an extra and generating a defect detection signal.

* * * * *

UNITED STATES PATENT AND TRADEMARK OFFICE
CERTIFICATE OF CORRECTION

PATENT NO. : 6,175,459 B1
DATED : January 16, 2001
INVENTOR(S) : Tomita

It is certified that error appears in the above-identified patent and that said Letters Patent is hereby corrected as shown below:

<u>Column 14,</u>
Line 1, after "means" insert -- detects a portion --.

Signed and Sealed this

Fifth Day of August, 2003

JAMES E. ROGAN
*Director of the United States Patent and Trademark Office*